(No Model.) 4 Sheets—Sheet 1.
C. POTTER.
MACHINE FOR MAKING STORAGE BATTERY PLUGS.
No. 590,857. Patented Sept. 28, 1897.
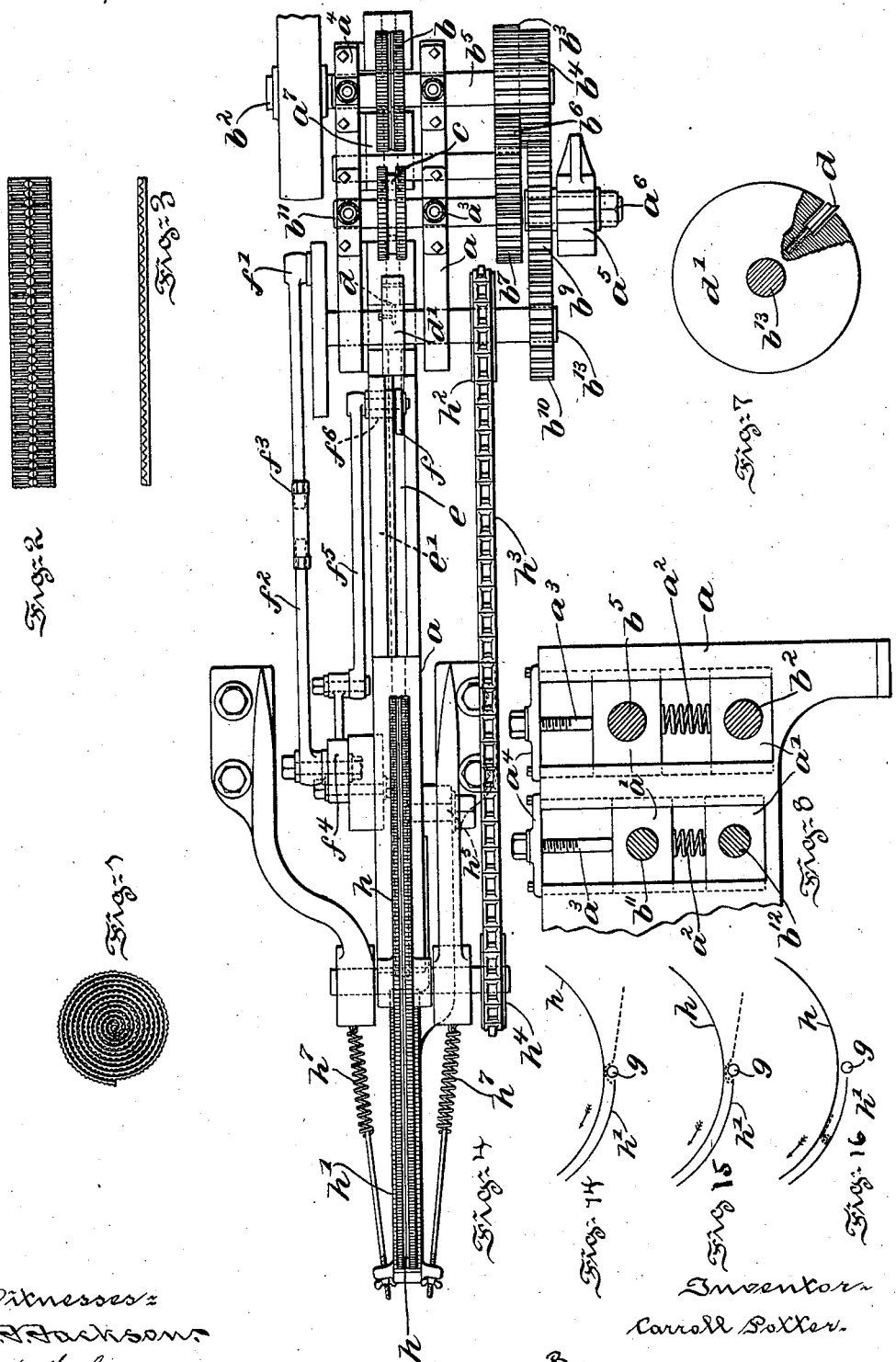

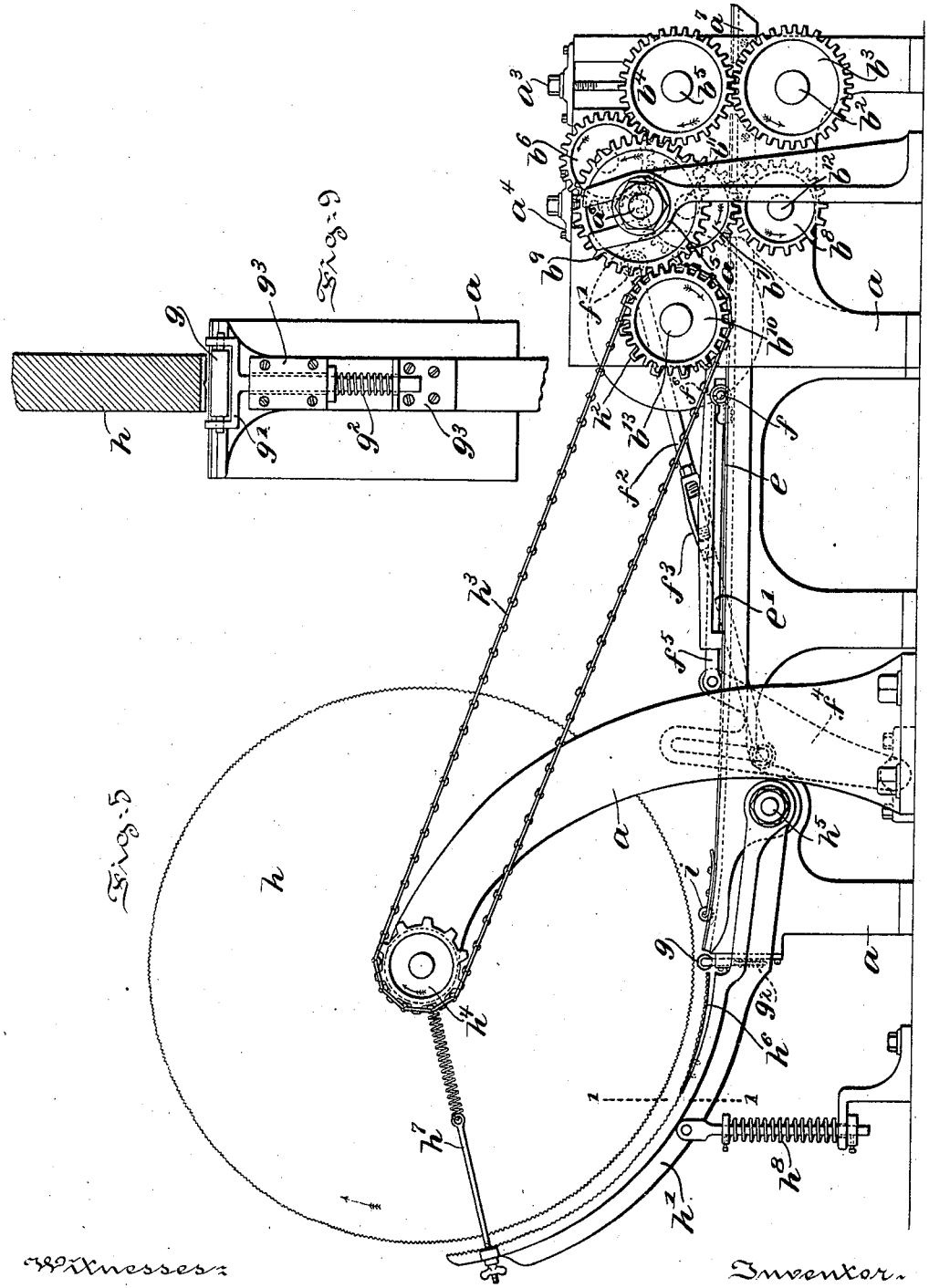

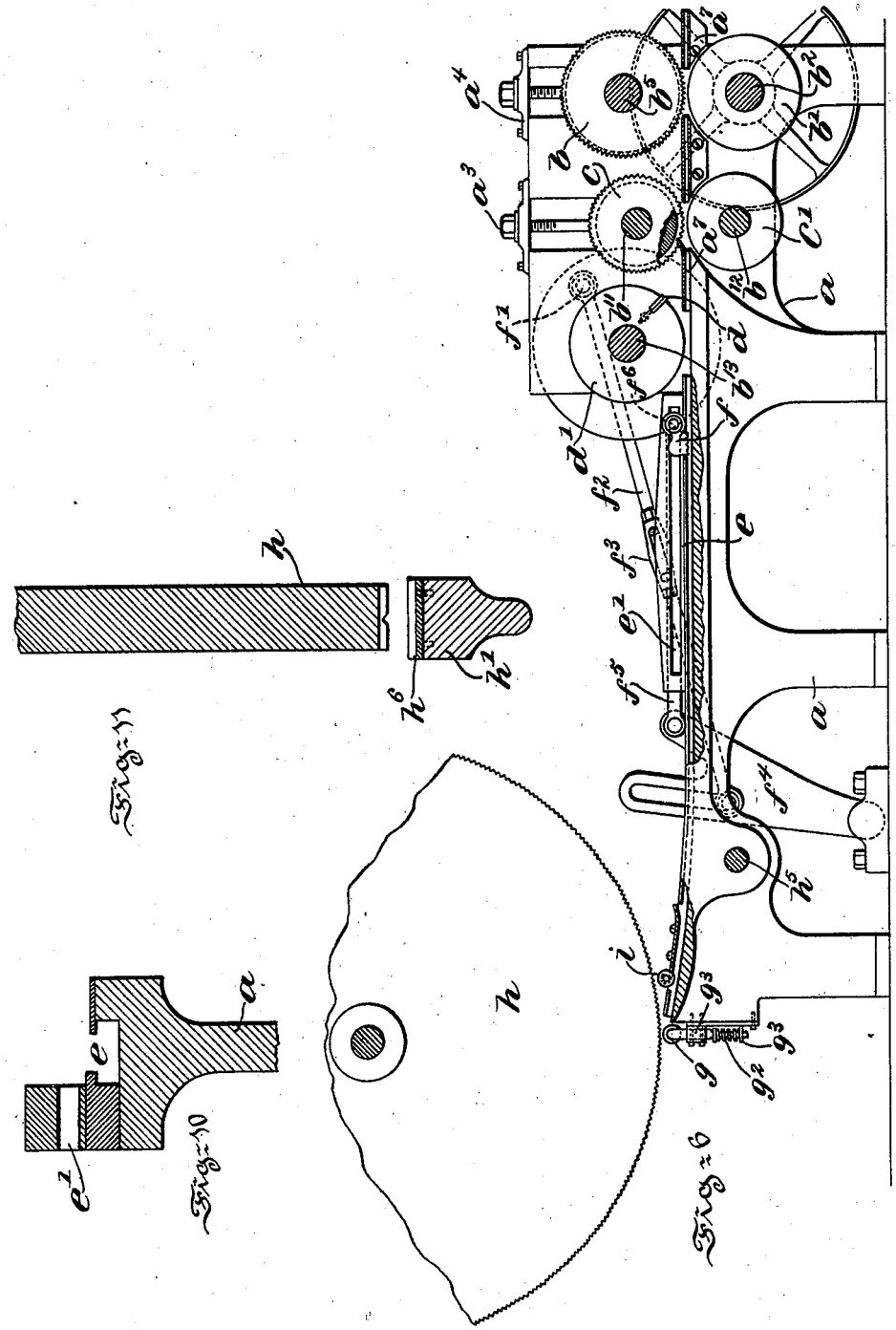

(No Model.) 4 Sheets—Sheet 4.
C. POTTER.
MACHINE FOR MAKING STORAGE BATTERY PLUGS.
No. 590,857. Patented Sept. 28, 1897.
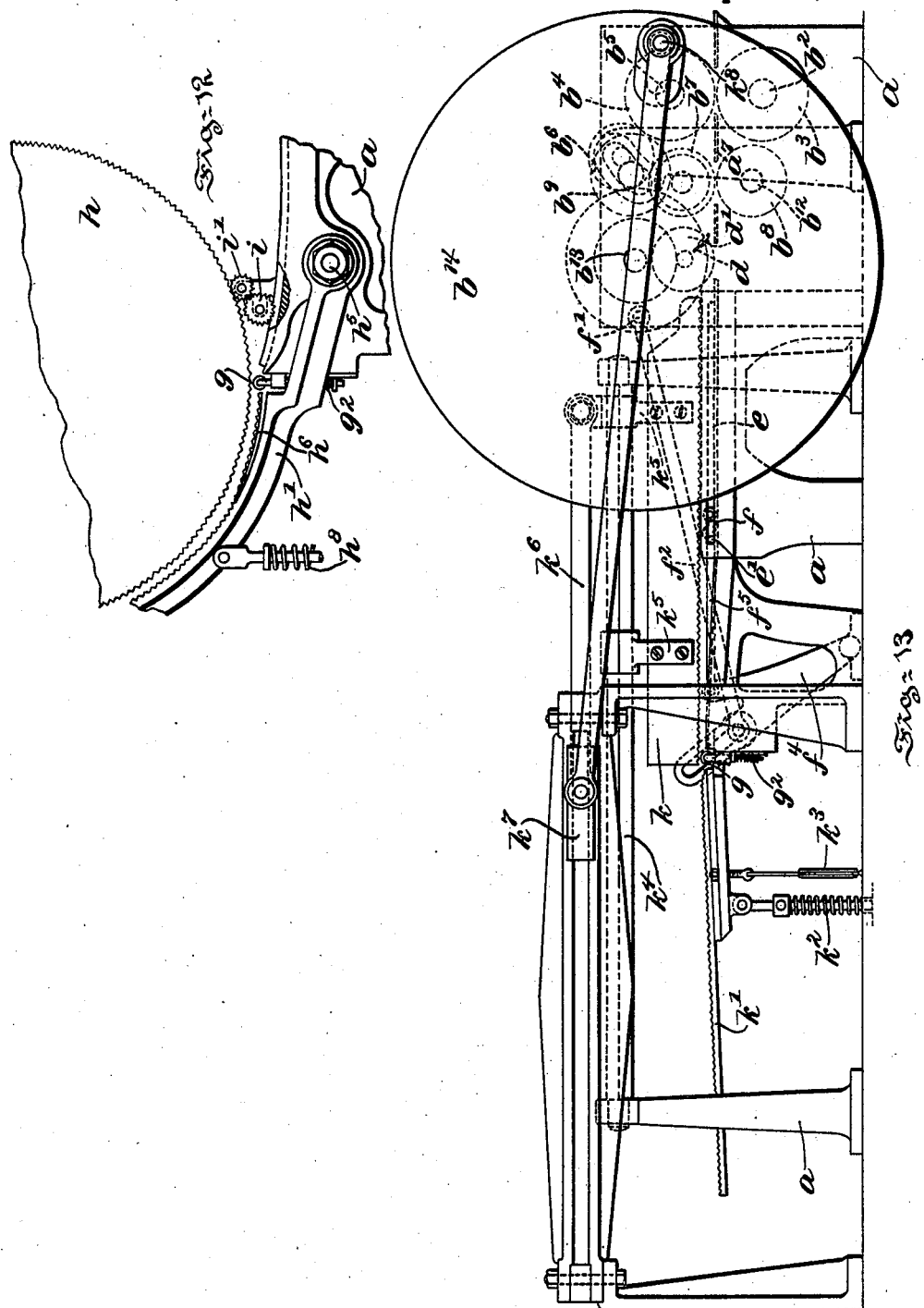
Witnesses:
W. S. Dickson
K. M. Gilligan
Inventor.
Carroll Potter.
By Augustus B. Stoughton.
Attorney.

UNITED STATES PATENT OFFICE.

CARROLL POTTER, OF PHILADELPHIA, PENNSYLVANIA.

MACHINE FOR MAKING STORAGE-BATTERY PLUGS.

SPECIFICATION forming part of Letters Patent No. 590,857, dated September 28, 1897.

Application filed October 26, 1896. Serial No. 610,076. (No model.)

*To all whom it may concern:*

Be it known that I, CARROLL POTTER, a citizen of the United States, residing at the city of Philadelphia, in the county of Philadelphia and State of Pennsylvania, have invented a new and useful Machine for Making Storage-Battery Plugs, of which the following is a specification.

Lead ribbon with or without one or more ribbed or roughened faces coiled or wound up upon itself spirally constitutes what is usually known as and what I shall herein designate a "storage-battery plug." Such plugs when properly framed constitute desirable storage-battery plates.

It is the object of my invention to manufacture such plugs by means of automatic machinery and to thus secure the advantages incident to the use of that mode of procedure.

To this end my invention comprises the improvements hereinafter described and claimed.

The nature, characteristic features, and scope of my invention will be more fully understood from the following description, taken in connection with the accompanying drawings, forming part hereof, and in which—

Figure 1 shows a side view of a storage-battery plug embodying features of my invention. Figs. 2 and 3 are respectively top and side views of one type of lead or other metal ribbon from which the plug shown in Fig. 1 may be made by coiling or rolling it into spiral form. Fig. 4 is a top or plan view of a machine embodying features of my invention. Fig. 5 is a side elevational view of the machine illustrated in Fig. 4. Fig. 6 is a longitudinal sectional view of Fig. 4, taken substantially through the line of travel of the tape or ribbon through the machine, certain parts of the machine being omitted. Fig. 7 is a detached view of the cutter forming part of the machine. Fig. 8 is a detached view illustrating bearings for the crimping and feed rolls. Fig. 9 is a detached front view of the kinking guide or roll. Fig. 10 is a sectional view illustrating the table on which the tape or ribbon is fed to the coilers. Fig. 11 is a sectional view taken on the line 1 1 of Fig. 5. Fig. 12 is a detached view illustrating a feeding attachment that may be employed in connection with a machine of my invention. Fig. 13 is a side elevational view of a machine embodying a modification of my invention; and Figs. 14, 15, and 16 are diagrammatic views hereinafter referred to.

The principle of my invention may be said to be coiling or spirally winding a lead or metal tape to form a storage-battery plug by operating from the outside or periphery and causing it to travel during its formation along between the substantially parallel faces of coilers, thus comparatively tightly coiling the ribbon upon itself into a plug that may be handled without danger of unwinding, and also rendering the employment of automatic machinery for this purpose possible and practicable.

I will now proceed to describe the mode of applying that principle which I believe to be the best, and in this connection I shall assume that the machine is required not only to spirally coil pieces of lead or metal tape into battery-plugs, but also to emboss, rib, or roughen one of the surfaces thereof. However, it must be borne in mind that the roughening, ribbing, or embossing features may be omitted or otherwise accomplished without departing from the spirit of my invention.

Referring to the drawings, and more particularly to Figs. 1 to 11 thereof, *a* represents suitable framework, of which the shape and pattern are not material so long as it is adapted to carry and support the working parts of the machine in their proper relative positions.

*b* and *b'* are crimping-rolls. These receive long lengths of plain lead or other metal ribbon, for example, from a suitable reel and rib, roughen, or emboss it. As shown, the periphery of the crimping-roll *b'* is smooth and the periphery of the crimping-roll *b* is grooved or equivalently prepared for producing on the flat ribbon ribs, for example, such as are shown in Figs. 2 and 3.

*c* and *c'* are feed-rolls that serve when present to feed the crimped strip forward to the cutter *d*, which operates to divide it into lengths which, when coiled up, constitute the required size of plug. As shown, this cutter *d* is mounted in and projects from the periphery of a cutter-disk *d'*, Fig. 7. At the time a length is cut from the crimped strip the forward end of the length lies upon the table *e*, Fig. 10, and is engaged by the pawl *f*.

This pawl $f$ carries the length forward until the kinking roller or guide $g$ presents it to the coiler $h$. Since the guide or roller $g$ is pressed, as will be hereinafter described, up to the coiler $h$, it follows that a downward bend, Fig. 14, over this guide or roller $g$ is imparted to the moving tape or ribbon, so that it is brought into contact with the coiler $h'$, the action of which is to retard the travel of the end of the tape or ribbon, Fig. 15. Thus the formation of the spiral coil is started. The coil is completed and consolidated or tightly wound by traveling along between the substantially parallel coilers $h$ and $h'$, Fig. 16. The latter is omitted from Fig. 6 to show the guide, but may be plainly seen in Figs. 4, 5, 11, and 12. Upon the completion of the plug it escapes over the top of the coiler $h'$. The coilers or, more properly, their working faces are substantially parallel and have surface motion the one in respect to the other. This parallelism permits each coil to roll along between the coilers, whereby such coil is not only wound, but also consolidated or tightly or permanently coiled. Moreover, a coil may be started at the entrance of these parallel coilers while one or more coils are being formed and consolidated at other portions thereof. Each complete coil or plug is delivered from the machine by traveling along between and escaping from the parallel coilers without interruption of their ordinary movements.

The movements of the parts above referred to may be effected and timed by the employment of mechanism adapted for those purposes. Power may be applied to a shaft $b^2$, upon which is keyed the crimping-roll $b'$ and a toothed wheel $b^3$. The toothed wheel $b^3$ meshes with a comparatively wide-toothed wheel $b^4$, keyed to a shaft $b^5$, that carries the crimping-roll $b$. The wide-toothed wheel $b^4$ drives two sets of wheels, whereof one set comprises the toothed wheels $b^6$, $b^7$, and $b^8$, and the other set comprises the toothed wheels $b^9$ and $b^{10}$. The wheels $b^7$ and $b^8$ are carried by the shafts $b^{11}$ and $b^{12}$, that carry the feed-rolls $c$ and $c'$. The wheel $b^{10}$ is keyed to a shaft $b^{13}$, that carries the cutter $d$ and sprocket-wheel $h^2$ and a crank-pin $f'$. The crank-pin $f'$ is connected by a connecting-rod $f^2$, that may be made adjustable as to length, for example, by means of a turnbuckle $f^3$ and that is connected with a rocker-arm $f^4$. The rocker-arm $f^4$ is connected by a link $f^5$ with a reciprocating cross-head $f^6$, that works in ways or guides $e'$ and that carries the pawl $f$. The sprocket-wheel $h^2$ operates by way of a chain $h^3$ and sprocket-wheel $h^4$ to rotate the circular collar $h$ in the direction indicated by the arrow in Fig. 5.

The shafts carrying the crimping and feed rolls may be afforded the requisite range of motion for adjusting them to operate on tapes of different thicknesses by journaling them in boxes $a'$, Fig. 8, adapted to work in ways or slots cut or otherwise formed in the frame $a$. Between each pair of these boxes is interposed a spring $a^2$. On top of the upper box is a stop, which comprises a screw $a^3$, adjustable in a tapped yoke $a^4$. When the screw $a^3$ is brought downward by turning it through its nut in the yoke $a^4$, it brings the shafts, and consequently the rolls carried thereby, nearer together. When the screw $a^3$ is moved upward, the spring $a^2$ operates to separate the shafts and rollers carried thereby.

It may be remarked that the bottom box $a'$ rests in the bottom of the slot upon the framework and need be removed only for purposes of repair. When this is to be done, the corresponding yoke is taken off.

It is sometimes desirable to change the length of the piece of tape that is rolled up to produce the plug in order to manufacture plugs of different sizes. This may be accomplished by changing the speed of the part that carries the cutter $d$. To this end the toothed wheel $b^9$ may be removed and replaced by another wheel of different diameter and having a different number of teeth. The frame of the machine may be provided with a fork $a^5$, in which the stud $a^6$, that carries the wheel $b^9$, may be adjusted and then clamped to place. Fixed guides $a^7$ may be provided and constructed in such manner that the tape runs through them on its way to and from the various rolls. However, these guides are not essential and may be omitted. The pawl $f$ is constructed to feed the tape in the direction of the coilers $h$ and $h'$. As shown, it operates by gravity. However, use may be made of a spring. The extent of travel of the pawl may be increased or diminished by adjusting the stud that carries the rod $f^2$ in the slot provided for this purpose in the rocker-arm $f^4$.

$i$ is a roller under which the length of tape passes when fed by the pawl $f$ to the kinking-roll $g$. It serves to hold the tape down, and thus assists in the operation of presenting the tape over the kinking-roll $g$ and at an inclination to the direction of motion of the working face of the coiler. The kinking-roll $g$ is journaled to a fork $g'$, Fig. 9, of which the shank is operated upon by a spring $g^2$ and afforded a range of motion in brackets or guides $g^3$, carried by a part of the framework $a$ of the machine. Instead of a spring $g^2$ a weight may be employed. The coiler $h'$ is provided with a roughened working face that conforms to a similar face on the coiler $h$. The coiler $h'$ is pivoted to the framework, as at $h^5$, and may be provided with a yielding or spring tongue $h^6$. The position of the free end of this tongue in respect to the periphery of the coiler $h'$ is a factor in determining the size of the opening in the center of the plug. The nearer it is to the coiler $h$ the smaller the opening at the center of the plug.

$h^7$ and $h^8$ are spring-supports for holding the coiler $h'$ in proper relation to the coiler $h$ and for permitting it to move downward in order to compensate for the increase in diameter of the plug as it is rolled.

As an attachment to the above-described machine use may be made of a toothed wheel $i'$, Fig. 12, suitably journaled so as to mesh with the coiler $h$ and feed-roller $i$, whereby motion is imparted to the roller $i$, with the result that it not only holds the tape down, but also assists in the operation of feeding it forward.

The coilers above described have substantially parallel curved working faces. However, the working faces may be straight and yet substantially parallel. In the modification of my invention shown in Fig. 13 $k$ and $k'$ are coilers of this type. The coiler $k'$ is pivoted to the bed of the machine, is pressed upward by the spring $k^2$, and is prevented from moving too far upward by the links $k^3$. This coiler is normally set at a slight inclination to the horizontal and is adapted to be turned downward. The purpose of this is to compensate for the increase in the diameter of the plug as it is rolled. The coiler $k$ is adapted to be reciprocated on a guide $k^4$, to which it is connected by suitable travelers $k^5$. One of the travelers $k^5$ is connected by a link $k^6$ to a cross-head $k^7$. This cross-head $k^7$ is connected by means of a link with a crank-pin $k^8$, connected with and rotated by the shaft $b^{13}$, for example, through the intervention of a disk $b^{14}$.

The mode of operation of the machine illustrated in Fig. 13 is the same as that of the machine illustrated in Figs. 4 to 11, inclusive, and will be understood by reference to the preceding description thereof.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. In combination a circular coiler, a second coiler conforming to a portion of the periphery of the circular coiler, devices for yieldingly supporting the last-mentioned coiler, means for rotating the circular coiler continuously in one direction in contact with the periphery of a plug, and devices for directing one end of the tape or ribbon onto one of said coilers, substantially as described.

2. A machine for making storage-battery plugs which comprises parallel coilers between which a tape or ribbon is wound and caused to travel, operating means for said coilers, and a guide or roll for directing one end of the tape or ribbon onto one of said coilers, substantially as described.

3. A machine for making storage-battery plugs comprising substantially parallel coilers between which a tape is wound and caused to travel along, a kinking guide or roller, a reciprocating feed-pawl, a table, and means for actuating said parts, substantially as described.

4. A machine for making storage-battery plugs comprising substantially parallel coilers between which plugs travel along and roll out, a kinking guide or roll, a feed-pawl and its table, a cutter, and means for actuating said parts, substantially as described.

5. A machine for making storage-battery plugs comprising two substantially parallel coilers between which a tape travels along and escapes in the form of a consolidated plug, a kinking guide or roller, a feed-pawl and its table, a cutter, feed-rolls for feeding a tape or ribbon to the cutter, and means for actuating said parts, substantially as described.

6. A machine for making storage-battery plugs comprising coilers between which a tape is wound, a kinking guide or roller, a feed-pawl and its table, a cutter, feed-rolls for feeding the tape or ribbon to the cutter, crimping-rolls, and means for actuating said parts, substantially as described.

7. In combination a movable coiler, a second coiler provided with a working face disposed substantially parallel with the working face of said movable coiler and having surface movement in respect thereto, and a yieldingly-supported kinking guide or roll whereby a tape or ribbon is rolled upon itself and caused to travel along and out from between said coilers, substantially as described.

8. In combination, a coiler having surface motion, a second coiler adapted to press upon the opposite side of a coil formed between the two, a kinking roll or guide, and a yielding tongue on the second coiler adapted to engage a tape or ribbon from the kinking roll or guide, substantially as described.

9. In combination a circular coiler, means for driving it, a second coiler conforming to a portion of the periphery of the circular coiler, devices for yieldingly supporting the last-mentioned coiler, a kinking guide or roll, and feed-rolls driven from the first-mentioned coiler, substantially as described.

In testimony whereof I have hereunto signed my name in the presence of two witnesses.

CARROLL POTTER.

Witnesses:
 JNO. TARBUCK,
 J. Y. BRADBURY.